(12) United States Patent
Behforooz et al.

(10) Patent No.: US 8,843,528 B1
(45) Date of Patent: Sep. 23, 2014

(54) QUERY-BASED USER GROUPS IN SOCIAL NETWORKS

(71) Applicant: Google Inc., Mountain View, CA (US)

(72) Inventors: Reza Behforooz, Mountain View, CA (US); George Baggott, Menlo Park, CA (US); Ana Maria Ulin Vazquez, Palo Alto, CA (US); Charles Mendis, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/063,383

(22) Filed: Oct. 25, 2013

Related U.S. Application Data

(63) Continuation of application No. 13/164,673, filed on Jun. 20, 2011, now Pat. No. 8,601,027.

(51) Int. Cl.
*G06F 7/00* (2006.01)
*G06F 17/30* (2006.01)

(52) U.S. Cl.
CPC ................... *G06F 17/3053* (2013.01)
USPC ........... 707/803; 707/804; 709/201; 709/204; 709/206

(58) Field of Classification Search
USPC ...................... 707/790, 802, 803, 804, 999.1; 709/201, 204, 206
See application file for complete search history.

(56) References Cited

U.S. PATENT DOCUMENTS

| 8,601,027 | B2 | 12/2013 | Behforooz et al. |
| 2002/0073065 | A1 | 6/2002 | Inaba et al. |
| 2004/0122681 | A1 | 6/2004 | Ruvolo et al. |
| 2008/0140650 | A1 | 6/2008 | Stackpole |
| 2008/0147659 | A1 | 6/2008 | Chen et al. |
| 2009/0204599 | A1 | 8/2009 | Morris et al. |
| 2009/0271370 | A1 | 10/2009 | Jagadish et al. |
| 2010/0063934 | A1* | 3/2010 | Khoo ............................. 705/319 |
| 2010/0318571 | A1 | 12/2010 | Pearlman et al. |
| 2011/0029615 | A1 | 2/2011 | Shaffer et al. |
| 2011/0185020 | A1 | 7/2011 | Ramamurthy et al. |
| 2011/0246574 | A1* | 10/2011 | Lento et al. ................... 709/204 |
| 2012/0158751 | A1* | 6/2012 | Tseng ........................... 707/751 |

FOREIGN PATENT DOCUMENTS

EP  1 338 967  8/2003

OTHER PUBLICATIONS

Authorized Officer Katrin Sommermeyer, International Search Report and Written Opinion for Application No. PCT/US2012/043298, dated Aug. 9, 2012 13 pages.
Ronald van Eijk et al., "We-centric, context-aware, adaptive mobile service bundles," Telematica Instituut, Freeband Frux D1.1, Nov. 30, 2004, 48 pages.

(Continued)

*Primary Examiner* — Hares Jami
(74) *Attorney, Agent, or Firm* — Fish & Richardson P.C.

(57) ABSTRACT

Implementations of the present disclosure include obtaining one or more queries, processing data stored in a data store based on at least one query of the one or more queries to identify a plurality of users, the plurality of users sharing a commonality that is a subject of the at least one query, generating one or more query-based social circles, the plurality of users populating a query-based social circle of the one or more query-based social circles, the query-based social circle being directed to the commonality and defining a distribution list for distributing digital content provided by one or more users of the plurality of users, and transmitting social circle data corresponding to the query-based social circle to display a representation of the query-based social circle to at least one user of the plurality of users.

19 Claims, 6 Drawing Sheets

(56) References Cited

OTHER PUBLICATIONS

Marc Steen et al., "Development of we-centric, context-aware, adaptive mobile services requires empathy and dialogue," Freeband Frux, 2005, 4 pages.

Junichiro Mori et al., "Real-world Oriented Information Sharing Using Social Networks," Proceedings of the 2005 International ACM SIGGROUP Conference on Supporting Group Work (Group 05), Nov. 6-9, 2005, pp. 81-84.

International Preliminary Report on Patentability issued in International Application No. PCT/US2012/043298 on Dec. 13, 2013, 10 pages.

\* cited by examiner

FIG. 4A

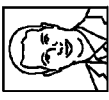

QUERY-BASED USER GROUPS IN SOCIAL NETWORKS

CROSS-REFERENCE TO RELATED APPLICATIONS

This application is a continuation application of and claims priority to U.S. application Ser. No. 13/164,673, filed on Jun. 20, 2011.

TECHNICAL FIELD

This specification generally relates to the dynamic generation of social circles in social networks.

BACKGROUND

Electronic social networks are network-based services that provide users with an ability to associate and communicate with each other. Users are able to identify other users with whom they have a social relationship (e.g., establishing other users as contacts within a social networking service). Once a social relationship has been expressed, the users typically are able to see communications, status updates, and other notifications generated by the social networking activities of their contacts.

Social networks also provide services that enable users to identify and associate with groups of other users who share a common interest. Some groups are manually created by a user, and other users are then able to choose to associate themselves with the group. In some cases, membership is open where any user is granted membership in the group upon request. In other cases, membership is moderated where one or more users manually decide to accept or deny other users' requests for membership.

SUMMARY

According to one innovative aspect of the subject matter described in this disclosure, a grouping of contacts, discussed herein as a social circle, can be dynamically generated in response to a query. The query can be processed to identify one or more contacts and a query-based social circle is automatically generated and populated with each of the one or more contacts. The query-based social circle can be presented to one or more users and can used to define a distribution of digital content through a social networking service.

In general, another innovative aspect of the subject matter described in this disclosure may be embodied in methods that include the actions of obtaining one or more queries, processing data stored in a data store based on at least one query of the one or more queries to identify a plurality of users, the plurality of users sharing a commonality that is a subject of the at least one query, generating one or more query-based social circles, the plurality of users populating a query-based social circle of the one or more query-based social circles, the query-based social circle being directed to the commonality and defining a distribution list for distributing digital content provided by one or more users of the plurality of users, and transmitting social circle data corresponding to the query-based social circle to display a representation of the query-based social circle to at least one user of the plurality of users.

These and other implementations may each optionally include one or more of the following features. For instance, the operations further include: receiving the digital content from at least one user of the plurality of users, receiving user input from the at least one user, the user input indicating instructions to distribute the digital content based on the query-based social circle, and in response to receiving the user input, distributing the digital content to users of the plurality of users; the operations further include: for each user, generating a relevance score, the relevance score reflecting a relevance of the query-based social circle to the user, and determining that the relevance score is greater than or equal to a threshold relevance score, wherein transmitting social circle data includes transmitting the social circle data to the user in response to determining that the relevance score is greater than or equal to a threshold relevance score; the operations further include: for each user, generating a plurality of relevance scores, each relevance score of the plurality of relevance scores reflecting a relevance of a respective query-based social circle to the user, ranking query-based social circles based on the plurality of relevance scores, and identifying a subset of query-based social circles based on the ranking, wherein transmitting social circle data includes transmitting the social circle data corresponding to query-based social circles in the subset of query-based social circles; the data includes data submitted by each user of the plurality of users to the social networking service; the digital content includes at least one of text, status data, an image, a video and a hyperlink; the plurality of users are anonymous to one another; the query includes a search query and processing data stored in a data store based on the query includes determining a commonality between one or more users based on the data; the commonality includes at least one of a location, an event, a locale and a route; obtaining the at least one query includes generating the at least one query in response to user input provided by a user of the plurality of users; the user input includes text input provided as at least a portion of a textual post to be distributed by the user through the social networking service; the operations further include processing digital content distributed through the social networking service to identify an occurrence of the commonality, wherein obtaining the at least one query includes generating the at least one query in response to the occurrence; the occurrence includes an event and the commonality includes attendance of each user of the plurality of users at the event; the occurrence is associated with a location and the commonality includes a presence of each user of the plurality of users at the location; each user in the plurality of users is a user of the social networking service; and transmitting social circle data corresponding to the query-based social circle to display a representation of the query-based social circle includes transmitting to each user of the plurality of users.

Other implementations of this aspect include corresponding systems, apparatus, and computer programs, configured to perform the actions of the methods, encoded on computer storage devices.

Particular implementations of the subject matter described in this specification may be used to realize one or more of the following, example advantages. In some implementations, social circles to define distribution of digital content can be automatically created and curated for users of a social networking service. In some implementations, commonalties with social connections can be surfaced such that users can become aware and take advantage of indirect social connections in the context of a social networking service that are more reflective of varying levels of real-world social interactions. In some implementations, users of a social networking service are able to share specific pieces of content with appropriate ad-hoc social circles that are presented. In some implementations, an ad-hoc social circle can be suggested for a single post, such that users are not required to create and curate a multitude of tiny one-time-use groups, or social circles. It is appreciated that implementations of the subject matter described in this specification may be used to realize other advantages not specifically discussed herein.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 4A and 4B depict example stream pages for a user of a social networking service.

Like reference numbers represent corresponding parts throughout.

DETAILED DESCRIPTION

Figure 1:
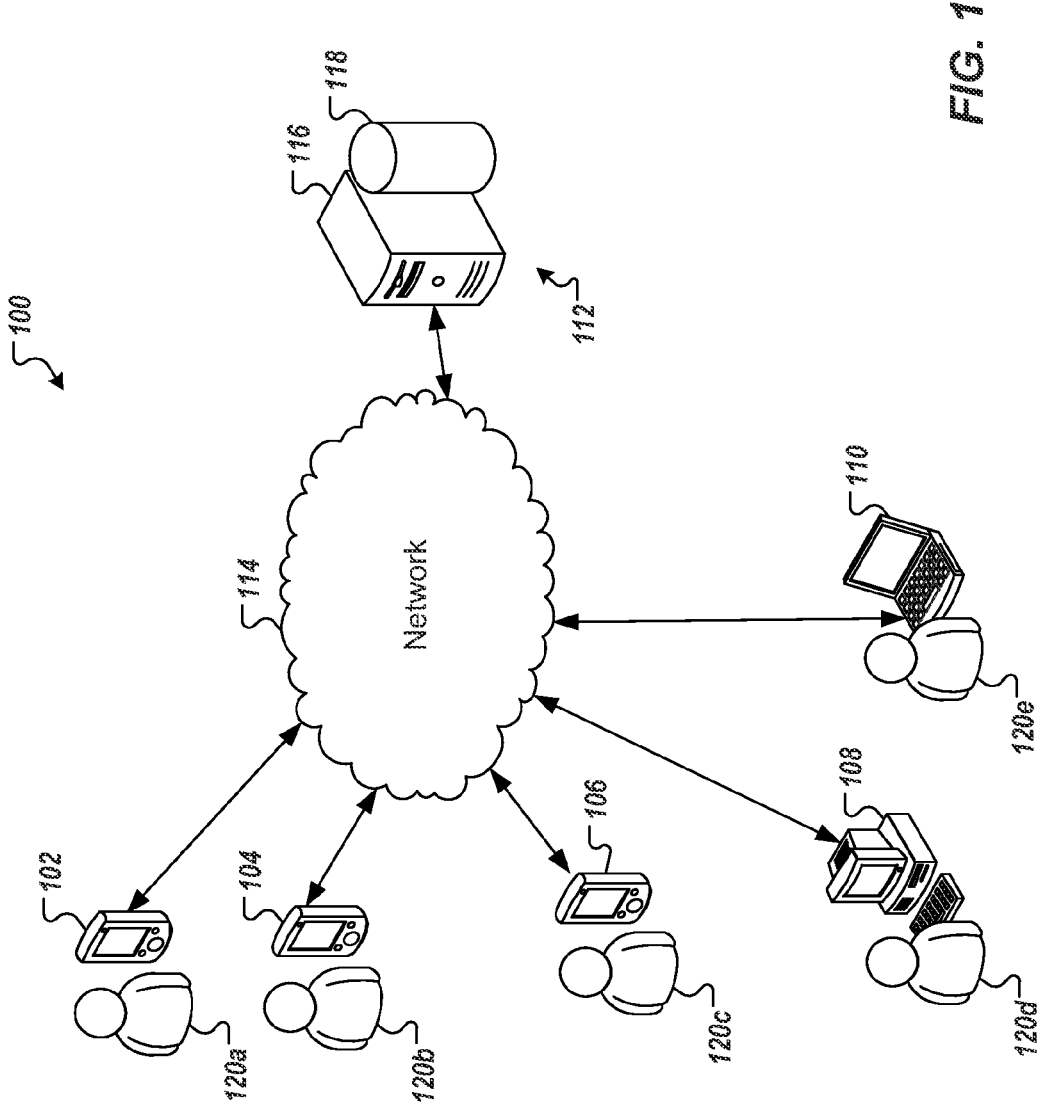
FIG. 1 depicts an example system that can execute implementations of the present disclosure.

Implementations of the present disclosure are generally directed to dynamic generation of a grouping of contacts, discussed herein as a social circle, in response to a query. The query is processed to identify one or more contacts and a query-based social circle is automatically generated, e.g., generated without further user intervention, that includes the one or more contacts as members of the query-based social circle. In some implementations, a query can be an explicit query that is generated and processed in response to a user request. In some implementations, a query can be an implicit query that can be automatically generated and processed. The query-based social circle can be proposed to the user and used to define a distribution of digital content through a social networking service. For example, the query-based social circle provides a list of one or more contacts, to which digital content can be distributed. In some implementations, the one or more contacts that are included in the query-based social circle are anonymous to a user that uses the query-based social circle to distribute digital content. In some implementations, the query-based social circle persists, such that a user can use the query-based social circle multiple times to distribute digital content. In some implementations, the query-based social circle is temporary, such that the user can use the query-based social circle once to distribute digital content.

In general, social circles are categories or groupings to which a user can assign their contacts (e.g., members of a social network in which the user belongs, other contacts of the user) and better control the distribution and visibility of digital content (e.g., social networking posts). A social circle can be provided as a data set defining a collection of contacts that may have some association with one another. Generally, a social circle can be described from the perspective of an individual that is the center of a particular collection of socially interconnected people, or from the aggregate perspective of a collection of socially interconnected people. In some implementations, a social circle can have narrowly defined boundaries, all of the members of the social circle are at least familiar with one another, and permission may be required for a member to join a social circle. In some implementations, a social circle can have broadly defined boundaries where, for example, none of the members are familiar with one another, but there is a commonality between all members (e.g., ride the same bus, are at the same location, are attending the same event, frequent the same locations, partake in the same activities).

In some implementations, a social circle provides a distribution list that defines which users receive or are otherwise allowed to access digital content. Example digital content can include textual content (e.g., posted text), status updates (e.g., busy, available, offline, check-in status), images, videos, hyperlinks and the like. In some implementations, the digital content can include a corresponding access control list (ACL), discussed in further detail below, that defines which users are to receive and/or are able to access the digital content.

Through the creation and use of social circles, the user can organize and categorize contacts into various different groupings that can be used to control the visibility and access those contacts have to the user's digital content (e.g., postings, digital pictures, videos, audio files, hyperlinks (e.g., uniform resource indicators (URIs)), and/or other content associated with the user's social networking profile). In some examples, the user can post an update about or a photo taken at an event to only a "event" circle, and spare other contacts from seeing information that may not be relevant to them.

In accordance with the present disclosure, one or more so-called query-based social circles can be suggested to a user based on query parameters that can identify one or more contacts based on automatically determined commonalities between the user and the contacts. In general, query-based social circles can facilitate communication between targeted social groups that can reflect indirect, real-world social connections.

For example, a query-based social circle can be generated based on a query. A query can be directly provided by a user or can be indirectly provided by a user. In some examples, the user can request that a query-based social circle be generated based on a query that is input by the user (e.g., the query is provided as "users that frequent Joe's Coffee Shop," or "users that ride at Lake Trails bike trail"). In some examples, the query is inferred from user interaction with the social networking service (e.g., the query is derived from text that the user inputs as part of a post to the social networking service). The query can be provided as a search query that is input to a search service (e.g., executed on a backend server system). The search service can search data in view of the query to identify one or more other users of the social networking service that have some commonality to the subject matter of the query. In some examples, and as discussed in further detail herein, data can be processed based on the query to identify users who have explicitly and/or implicitly indicated to the social networking service that they are somehow associated with a particular subject, e.g., a commonality. In some implementations, example subjects can include a location (e.g., restaurant, coffee shop, park, museum, school), an event (e.g., concert, sporting event), a locale (e.g., a town, a city, a neighborhood), a route (e.g., a bus route, a hiking route, a biking route) and the like.

In some examples, the subject can include location. Location can be determined based on signals (e.g., GPS location information, WiFi location information, cell tower location information, discussed above), and/or explicit locations provided by users. For example, users of the social networking service can check into a particular location or venue during an event. In some implementations, this check-in can be achieved explicitly by the user executing functionality provided by the social networking service to explicitly broadcast that the user is at the particular location. For example, when the user arrives at a particular location (e.g., Joe's Coffee Shop), the user can check into the location by explicitly informing the social networking service. In response, the social networking service can broadcast that the user is at the particular location (e.g., "User has checked into Joe's Coffee Shop") to contacts of the user. In some implementations, locations of users can be achieved implicitly based on information extracted from data submitted to the social networking service by the user (e.g., a status update including text identifying the location, photos of signage and/or landmarks at the location). In some implementations, the user can choose not to broadcast or have data extracted.

In some examples, a query-based social circle can be based on future events (e.g., a meeting, a reunion) in which a query that identifies the planned attendees of the planned event can become eligible for membership in a social circle organized around the event. For example, a user can invite contacts to attend an event by transmitting electronic invitations to the contacts. Data associated with the invitation and/or other data provided by the user can be analyzed to determine that an event is planned and a query can be generated to identify attendees. A query-based social circle can be generated and can include the identified attendees.

Large numbers of people have embraced the use of electronic social networking services as tools for building and maintaining networks of personal, familial, academic, professional, and other interpersonal relationships. Real-life social networks also include dynamically shifting relationships in which tangential social contacts may be united through common behaviors, geographic location, and/or temporal locations, for example. For example, two or more users may regularly visit the same coffee shop and therefore implicitly form a social circle of patrons of the coffee shop.

In another example, the social network system may determine that an increasing number of posts, photos, or other information is being submitted by an increasing number of users from a particular location or along a particular route (e.g., a crowd of spectators at golf tournament, a crowd of protesters outside city hall, tourists on a cruise ship at sea) within a particular timeframe. In response, it can be determined that an event or other happening that may be of interest is occurring at the particular location. In response, a query-based social circle can be generated and can include users that are determined to be or have been in attendance at the event. In one example, a flash mob can occur at a particular location, during which participants in the flash mob and/or observers of the flash mob can distribute textual posts, images and/or video of the flash mob using the social networking service. The sudden increase in digital content traffic being distributed by a large number of users at the particular location can trigger a query to identify the users that may be present at the flash mob and to generate a query-based social circle including the identified users.

FIG. 1 is a diagram of an example network architecture 100 that can execute implementations of the present disclosure. The network architecture 100 includes a number of client devices 102-110 communicatively connected to a server device 112 by a network 114. The server device 112 includes a processing device 116 and a data store 118. The processing device 116 executes computer instructions (e.g., social network computer program code) stored in the data store 118 to perform the functions of a social network server.

A number of users 120a-120e of the client devices 102-110, respectively, access the server device 112 to participate in a social networking service. For example, the client devices 102-110 can execute web browser applications that can be used to access the social networking service. In another example, the client devices 102-110 can execute software applications that are specific to the social network (e.g., social networking "apps" running on smartphones).

The users 120a-120e can participate in the social networking service provided by the server device 112 by posting information, such as text comments (e.g., updates, announcements, replies), digital photos, videos, or other appropriate electronic information. In some implementations, information can be posted on a user's behalf by systems and/or services external to the social network or the server device 112. For example, the user 120a may post a review of a movie to a movie review website, and with proper permissions that website may cross-post the review to the social network on the user's 120a behalf. In another example, a software application executing on a mobile device, with proper permissions, may use global positioning system (GPS) capabilities to determine the user's location and automatically update the social network with his location (e.g., "At Home", "At Work", "In Brownsdale, Minn.").

Users 120a-120e interacting with the client devices 102-110 can also use the social network provided by the server device 112 to define social circles to organize and categorize the users' 120a-120e relationships to other users of the social network. Examples of the creation and use of social circles are provided in the description of FIG. 2, and throughout the remainder of the present disclosure.

In some implementations, the client devices 102-110 can be computing devices such as laptop or desktop computers, smartphones, personal digital assistants, portable media players, tablet computers, or other appropriate computing devices that can be used to communicate with an electronic social network. In some implementations, the server device 112 can be a single computing device such as a computer server. In some implementations, the server device 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

Figure 2:
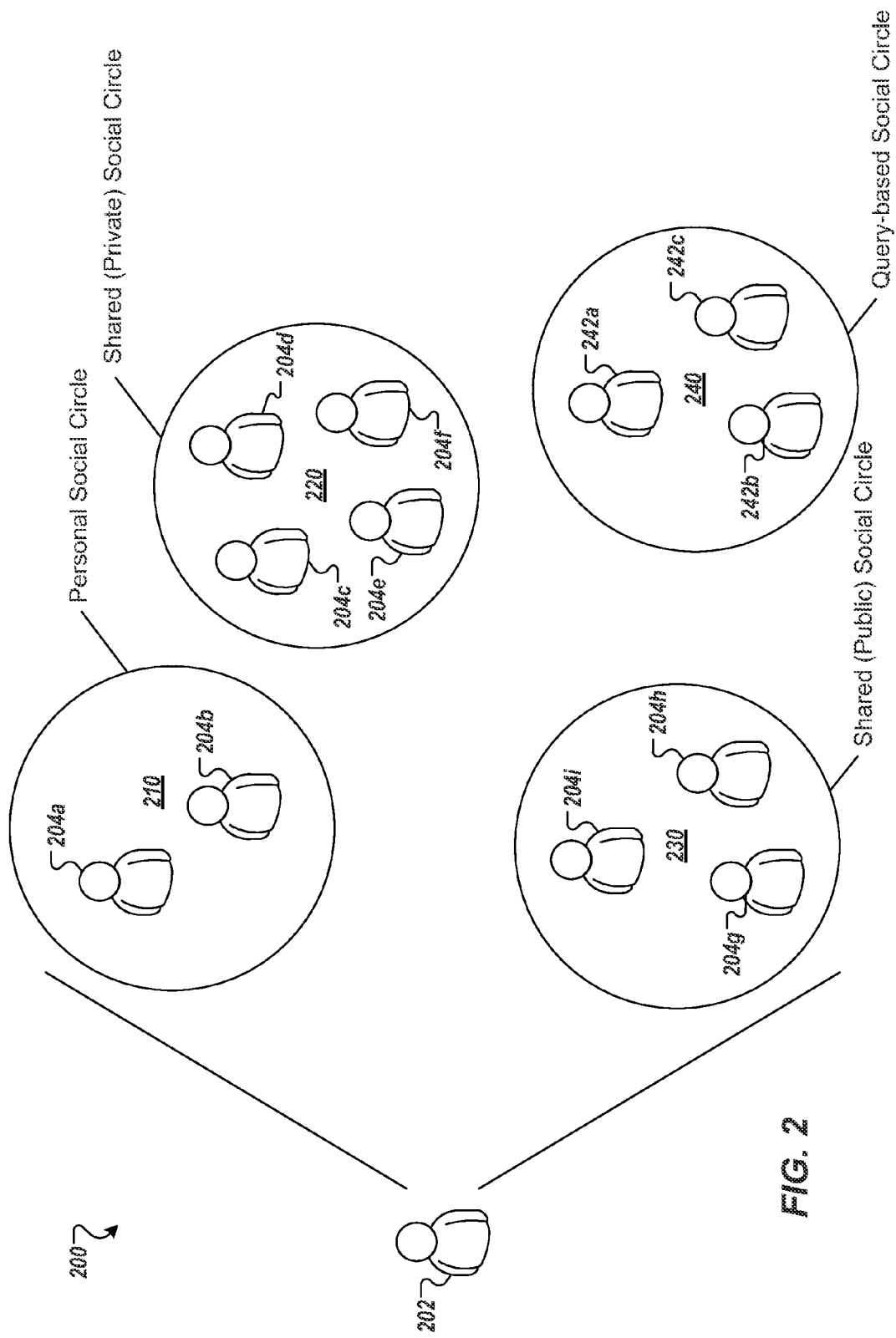
FIG. 2 is a diagram of an example social network including social circles.

FIG. 2 is a diagram of an example social network 200 including social circles. A user 202 is a member of a social network that supports the creation and use of social circles (e.g., the social network provided by the server device 112 of FIG. 1). In the present example, the user 202 has a number of contacts 204a-204i with which the user 202 can have some form of relationship (e.g., friends, coworkers, customers, teammates, clients, relatives, club members, classmates). The user 202 categorizes the contacts 204a-204i by assigning them to one or more social circles, such as a social circle 210, a social circle 220, and a social circle 230. A social circle 240, which has a number of contacts 242a-242c, is provided as a query-based social circle that can be automatically generated without input from the user 202. In some implementations, the social circle 240 can be generated based on information gathered from and has some commonality among the user 202 and the users 242a-242c (e.g., posts, uploaded photos, check-ins, volunteered location information).

The social circle 210 is a personal social circle. In some implementations, personal social circles are groupings created by and may be known only to the user 202 (e.g., the contacts 204a, 204b may receive no indication that they are in the user's 202 personal social circle 210). In some implementations, personal social circles are groupings created by the user 202 and may be known to the user 202 as well as the contacts (e.g., contacts 204a, 204b) that are members of the social circle (e.g., the contacts 204a, 204b receive an indication that they have been added to the personal social circle 210).

In some implementations, personal social circles may be used to organize and categorize the contacts 204a-204i in ways that are relevant to the user 202. In some implementations, the user 202 may use personal social circles to organize contacts in order to discretely target which of his contacts 204a-204h will see certain postings or have access to particular information. For example, the user 202 may be planning a surprise party for a small group of friends. As such, the user can organize contacts into "Surprise Party Attendees" and "Surprise Party Honorees" personal social circles. By doing so, the user 202 may better target selected postings to the friends attending and/or helping to plan the surprise party (i.e., Surprise Party Attendees), while targeting selected postings to friends that are to be honored at the surprise party (i.e., Surprise Party Honorees) to maintain the integrity of the surprise.

The social circle 220 is a shared private social circle, which may also be referred to simply as a shared circle. In general, shared private social circles are social circles that the user 202 creates and invites contacts to voluntarily join. Contacts that accept the invitation become members of the shared private social circle. Members of a shared private social circle can see information posted to that circle by the user 202 and can post information to be shared with other members of the shared private social circle. For example, the user 202 may tend to post a large number of jokes to the social network. However, while some of the contacts 204a-204i may find the jokes to be entertaining, others may find them to be simply annoying. Realizing this, the user 202 may create a "jokes" shared private social circle and invite some or all of the contacts 204a-204i to join. With the "jokes" social circle in place, the user 202 may post witticisms to the "jokes" circle, and only those contacts who have accepted the invitation are able to see the user's 202 comicality. Similarly, members of the shared private social circle are able to post messages to the circle, and those posts are visible to other members of that circle.

The social circle 230 is a shared public circle. In general, shared public circles are social circles that the user 202 creates, and invites contacts to voluntarily join. Further, the existence of a shared public circle is publicly available such that other users of the social networking service (e.g., not necessarily just the user's 202 contacts 204a-204i) may request to join the public social circle. Members of shared public circles may post information to, and see updates posted by, other members of the same public shared circle. In some implementations, public shares circles may be "fan" or "group" circles (e.g., circles dedicated to a particular place, event, product, movie, celebrity, sports team, company, concept, philosophy, organization, support network). For example, the user 202 may create a shared public circle for his band, and fans of his act may join the circle to discuss upcoming shows, download MP3s of the band's music, or post videos from recent concerts. In another example, the user 202 may create a shared public circle for alumni of his high school graduating class, which his former classmates may find and join in order to stay in touch with one another and post pictures from their school days. Once a shared public circle is created, in some implementations the user 202 can invite people to join the circle. In some implementations, nonmembers of the circle can request membership in the shared public circle, and membership in a shared public circle may be automatic upon request, or may require the user's 202 approval to become members of the shared public circle.

The social circle 240 is a query-based social circle. In general, query-based social circles are generated based on one or more commonalties between users of the social networking service (e.g., traits, locations, behaviors, or other types of information that a number of users have in common). For example, a query-based social circle can be generated based on a physical location (e.g., a restaurant, a resort, a school), and users who express a relationship with the location can be offered membership in the query-based social circle. In some implementations, the relationship can be explicit. For example, the user 202 may post a review of the location (e.g., a restaurant, a play, an art exhibit), may "check-in" to the location, or identify the location in an online profile (e.g., as a student at a particular school). In some implementations, the relationship may be implicit. For example, the user 202 may volunteer location information, and from this information a social networking system may determine that the user 202 regularly visits in the location. In another example, the user 202 may upload photos that have been geotagged with the coordinates of the location. In yet another example, social networking posts can be analyzed to implicitly determine information about the posts and/or the user, such as by extracting keywords from a post (e.g., "Loving it here in Las Vegas!") or by recognizing objects in uploaded photos (e.g., an image of the Eiffel Tower identified in a photo can imply that the photo was taken near the Eiffel Tower).

In some implementations, the movement (e.g., location) of users along a common path and/or during a particular time period can be used to identify a query-based social circle. For example, the social networking system may determine that user 202 and the users 242a-242c routinely travel along the same route, such as a bus route, and offer the social circle 240 as a query-based circle that includes users who likely ride the identified bus route. Furthermore, the social networking system may determine that not only do the user 202 and the users 242a-242c travel the same route, but they also routinely do so at the same time. The social networking system may infer that the user 202 and the users 242a-242c routinely ride the same bus, and offer the social circle 240 as a query-based social circle for riders of a particular bus. In use, the user 202 may have accidentally dropped his phone on the bus, and may join the social circle 240 to ask other bus riders if any of had picked up the phone.

In some implementations, continued membership in the circle may be dependent upon user behavior. For example, the user 202 may be a member of, or may be offered to join, the social circle 240 only as long as the social networking system continues to determine that the user routinely visits the location (e.g., routinely rides the identified bus route). For example, if the user 202 stops riding the aforementioned bus (e.g., as indicated by his location information), the social networking system may stop offering him membership in the social circle 240. Alternatively, if the user 202 is already a member of the social circle 240, the social networking system may suggest that the user revoke his membership, or his membership may be automatically revoked.

In some implementations, membership in a query-based social circle may be dynamic based on events. For example, the user 202 may schedule a meeting on his calendar, and invite the users 242a-242c to attend. In such an example, the social circle 240 may be formed for the meeting. In some implementations, membership in a query-based social circle may be limited to a predetermined time before, during, and/or after an event. For example, the users 202 and 242a-242c may not be visible to each other through the social circle 240 until half an hour before the meeting (e.g., to see location updates in case somebody is running late). In another example, the social circle 240 may discarded at some later time (e.g., a day after the meeting, an hour after the meeting, after all the users 202 and 242a-242c have revoked their memberships in the social circle 240).

In some implementations, membership in a query-based social circle may be dynamic based on user location. For example, the social circle 240 may include the users 242a-242c who are currently within a pre-defined radius of the user 202. In use, the user 202 can interact with the users 242a-242c who are currently at the same nightclub, park, concert or beach, for example. In another example, the social circle 240 may include the users 242a-242c who have been within a pre-defined distance of the user 202 in the past week (e.g., the user 202 wishes to contact the user 242a whom she met at the library last night).

In another example, the social networking service may generate the social circle 240 based on longer-term analysis of location information. For example, the users 242a-242c may be determined as living or working within a particular distance of the user 202 and/or within the same neighborhood (e.g., location information indicates that the users routinely remain within an area overnight, they spend more than a predefined percentage of their time in the area on average, a predefined percentage of their geo-tagged photos come from the area), and the users 202 and 242a-242c may be offered membership in the social circle 240 as a "neighbors" social circle. In use, the user 202 could send a message about his lost cat to his neighbors without sending the message to someone who is simply a visitor to the neighborhood. In some implementations, as the results of the longer-term analysis of location information change, so too can a user's affiliation with a query-based social circle. For example, the user 202 may move to a different neighborhood, and in such an example the users 242a-242c may be replaced by other users also detected as residing in the user's 202 new neighborhood.

In some implementations, one or more default social circles can be provided or suggested to a user when the user subscribes to a social networking service. For example, "Friends," "Family," and "Coworkers" social circles can automatically be provided in a user's profile upon the user subscribing to the particular social networking service. Other social circles can automatically be provided including, for example, an "Acquaintances" social circle and/or a "Just Following" social circle. In some implementations, the automatically created or suggested social circles can include personal social circles. Although default social circles can be automatically provided, it may be left to the user to actually populate the default social circles with contacts. For example, each of the default social circles may initially be empty of contacts, and the user populates each of the default social circles as discussed in further detail herein.

In some implementations, one or more default social circles can be automatically generated based on the user's profile information. For example, the user's profile may include demographic data (e.g., age), job data and/or interests data (e.g., sports, hobbies). Through data mining techniques (e.g., clustering social circle creations over a threshold number of users), a provider of the social networking service may determine that users within a particular demographic typically create one or more particular types of social circles. By categorizing a user within a particular demographic, the provider of the social networking service can suggest or automatically generate one or more particular default social circles. For example, if a particular user falls within a demographic that corresponds to a high school student, a default "School Friends" social circle may be suggested to or automatically created for the user. As another example, if a particular user falls within a demographic that corresponds to a college student, a default "College Friends" social circle may be suggested to or automatically created for the user. Social circles can also be suggested or created based on interest data provided in a user's profile. For example, if a particular user's interests include skiing, a default "Ski Buddies" social circle may be suggested to or automatically created for the user.

As discussed herein, posts can be distributed to contacts within the social network including one or more social circles, such that they are exclusively viewable by the indicated contacts and/or contacts within one or more indicated social circles. For example, and as discussed previously, a user of the social networking service can generate a post and indicate one or more social circles for distribution of the post. In some implementations, an auto-complete component enables the user to type in part of the name of a social circle and/or individual contact to specify which social circles and/or individual contacts require delivery of the post content. During a post write-time, a post data set is transmitted from the user's client computing device (e.g., client device 102 of FIG. 1) to a distribution hub, which can be provided at a server (e.g., server device 112 of FIG. 1). The post data set includes a plurality of data. In some implementations, the post data set includes content data (e.g., text, uniform resource indicator (URI)), timestamp data (e.g., a timestamp indicating the time that the post was generated), distribution data (e.g., contacts and/or one or more social circles), and identification (ID) data (e.g., an ID assigned to the post data set upon generation of the post). In some implementations, the distribution data is processed to provide an access control list (ACL) that specifies which contacts within the social networking system are granted access to the post content. In some implementations, the distribution hub determines end points the post data set is to be distributed to based on the ACL. More specifically, the set of contacts that care about the post and/or that are allowed access to the post is determined based on the ACL and the ID of the post is written to a per user/view index at the distribution hub. When fetching posts to distribute to a user, the user/view index is accessed and the IDs of the various posts that the user is allowed to view are determined. The post data sets are retrieved from a data store (e.g., data store 118 of FIG. 1) and are transmitted to a client device associated with the requesting user.

Users of a social networking service can voluntarily submit information to the social networking service for sharing such information with other users of the social networking service. Example information can include a textual post, a status update, a digital image, a check-in status, a digital video. Other information can be submitted to the social networking service. In some examples, a timestamp can be associated with each piece of information submitted by a user (e.g., a timestamp can be generated and associated with a user status update corresponding to the time at which the user submitted the status update). In other examples, a user can opt to provide location information (e.g., GPS location information, WiFi location information, cell tower location information) to the social networking service, which can indicate the user's location at a given time. This information can be stored to a central repository such as the data store 118 of FIG. 1. As discussed herein, the social networking service can process the user information stored in the central repository to generate one or more query-based social circles, which can be presented to users of the social networking service.

In some implementations, a query can be generated and can be used to identify users based on some commonality between the users. In some examples, the query can correspond to users that have some association with a particular subject. Example subjects can include a location, an event, a locale (e.g., a town, a city, a neighborhood), a route (e.g., a bus route, a hiking route, a biking route) and the like. The data provided in the data store can be processed to identify a plurality of users that are associated with the subject. In some implementations, the query can be a relatively simple query to provide a broad range of results. Using a location (e.g., a café, a restaurant, a theater) as an example subject, an example query can be directed to users that have visited the location. The data in the data store can be processed based on the query to provide a first set of results that includes users that have visited the location. In some implementations, the query can be a more complex query to provide a narrower range of results. An example query can be directed to users that have visited the location a threshold number of times (e.g., 10 times) within a predetermined time period (e.g., within the last month). The data in the data store can be processed based on the query to provide a second set of results that includes users that have visited the location. The number of users identified in the first set of results is likely greater than the number of users identified in the second set of results.

The social networking system can generate one or more query-based social circles based on the query and the results. In some implementations, a query-based social circle can be generated and can be associated with a particular subject. Users that are identified in the results can be invited to use the query-based social circle. For example, the query-based social circle can be presented to a user in a graphical user interface, discussed in further detail below. The user can use the query-based social circle to distribute digital content. In some implementations, a user can opt into or opt out of being presented with query-based social circles for use in distributing digital content, and/or being a member of a query-based social circle.

In some implementations, a query can be dynamically generated based on real-time user input (e.g., a post being composed by a user). In some examples, input provided by a user can be analyzed on-the-fly before completion and submission of the input to generate and distribute a post to a social networking service. Example input can be textual input (e.g., text being entered by the user to define a post). A query can be generated in response to the input and a query-based social circle can be generated and presented to the user as an option for distribution of the input (e.g., textual post) in a social networking service. As one example, a user intends to warn fellow bikers that a particular biking route is closed today by generating and distributing a post to contacts within a social networking service. The user types a message that contains the name of the particular biking route. The message can be analyzed and the biking route can be identified as a location of potential interest and, in response, a query can be issued to find other users of the social networking service that commonly use the biking route. The other users may or may not include users that are already known to the user. A query-based social circle can be generated and can be presented to the user as a recommendation for distribution of the post regarding closure of the biking route. In some implementations, the other users provided in the query-based social circle can be anonymous to the user submitting the post.

In another example, a user intends to share a digital image. Based on metadata provided in the underlying image file, the location where the image was taken and at what time the image was taken can be determined. A query can be issued to determine who, among the user's established contacts within the social networking services was at the location at the particular time. A query-based social circle can be generated and can be presented to the user as a recommendation for distribution of the digital image. As another example, a user can frequently check into and rate businesses of a particular category in a particular locale (e.g., more frequently than the average for users in that locale). A query can be issued to identify other users that have a similar interest in businesses of the same category in the locale. A query-based social circle can be generated and can be presented to the user as a recommendation for distribution of digital content relating to businesses of the particular category in the particular locale. In some implementations, the other users provided in the query-based social circle can be anonymous to the user submitting the content.

In some implementations, a user need not explicitly join the query-based social circle as a member and can simply use the social circle as a distribution list (e.g., ACL) to distribute digital content. In some implementations, a user can anonymously distribute digital content using the query-based social circle. In some implementations, when distributing digital content using the query-based social circle, the user can allow certain information associated with the user to be made public to other users of the query-based social circle. Example information can include a username, a profile picture and/or profile information. In some implementations, the user can explicitly join the query-based social circle, such that the user's identity within the social networking service may be made known to other users of the query-based social circle.

In some implementations, a user can add contacts to a query-based social circle. For example, a query-based social circle can be generated and can be populated with other users of the social networking service, as discussed above. The query-based social circle can be presented to a user for distribution of digital content. In some examples, the user may determine that digital content should also be distributed to contacts of the user within the social networking service. Consequently, the user can add known contacts to the query-based social circle.

In some implementations, a user can automatically receive content distributed by other users of the query-based social circle. For example, if the user is presented with a query-based social circle (e.g., in a user interface of the social networking service), digital content distributed by other users of the query-based social circle may be distributed and presented to the user without the user explicitly requesting to receive such digital content. In some implementations, the user can elect to not receive any digital content distributed by other users of the query-based social circle. For example, the user can provide user input through a user interface of the social networking service, the user input indicating that digital content distributed through the query-based social circle should not be distributed to the user. In short, the user can remove themselves from the ACL underlying the query-based social circle. In some implementations, the user can elect to not receive any digital content distributed by one or more particular other users of the query-based social circle. For example, the user can provide user input through a user interface of the social networking service, the user input indicating that digital content distributed by a particular other user through the query-based social circle should not be distributed to the user.

In some implementations, a query-based social circle that is presented to the user for distribution of digital content can be locked from editing or modification by the user. For example, the user may be prevented from adding one or more contacts to the query-based social circle. As another example, the user may be prevented from removing one or more contacts from the query-based social circle. Instead, and in some implementations, the user can simply block digital content that is distributed by other users of the query-based social circle, as discussed above.

In some implementations, a query-based social circle can correspond to a locale (e.g., a town, a city, a neighborhood) that is common to a plurality of users. For example, a query can be generated and processed to identify users that may live in a particular neighborhood. An example query can correspond to users that spend a significant amount of time in or around a particular neighborhood (e.g., users that overnight in the particular neighborhood). The query-based social circle can be presented to identified users for use as a distribution list for digital content. For example, a user that lost a pet can distribute digital content (e.g., a textual description, image and/or video) to other users that may be associated with a query-based social circle that is generated based on the neighborhood that the user lives in. In this manner, the digital content is targeted to a relevant audience that may be able to actually assist the user in recovering the lost pet although the user may not actually know the other users that make up the audience.

Privacy settings can be stricter for query-based social circles that are generated based on user locale. For example, all users associated with the particular query-based social circle may remain anonymous to other users associated with the particular query-based social circle. In some implementations, a user may voluntarily provide user identity information. Continuing with the lost pet example provided above, the user searching for the lost pet may provide contact information (e.g., telephone number, email address) that other users can use to contact the user in the event that the lost pet is found. In any case, the user's home address is not directly determinable through the query-based social circle.

In some implementations, a query-based social circle can correspond to a route (e.g., a bus route, a hiking route, a biking route) frequented by users. For example, a query can be generated and processed to identify users that frequently travel along a bus route. An example query can correspond to users that travel on a particular bus at a particular time during weekdays. The query-based social circle can be presented to identified users for use as a distribution list for digital content. For example, a user that lost a mobile phone on the bus can distribute digital content (e.g., a textual description) to other users that may be associated with a query-based social circle that is generated based on the particular bus route. In this manner, the digital content is targeted to a relevant audience that may be able to actually assist the user in recovering the lost mobile phone. Query-based social circles can be generated based on other types of routes such as hiking and biking routes. In this manner, users can target digital content to a relevant audience although they may not actually know the other users that are to receive the digital content.

Figure 3:
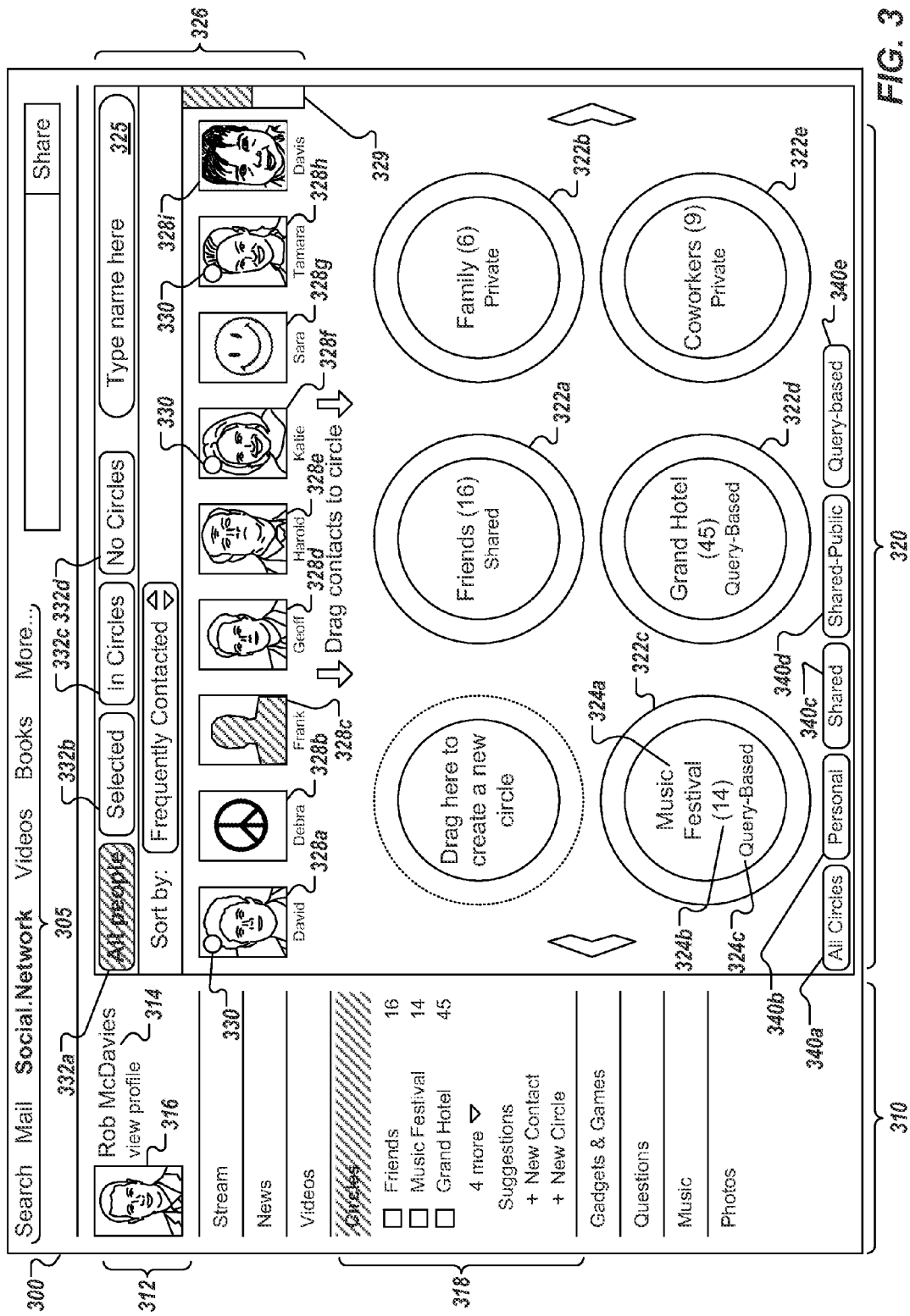
FIG. 3 depicts an example graphical user interface for creating and maintaining social circles using an example social networking service.

FIG. 3 depicts an example graphical user interface (GUI) 300 for creating, editing and/or maintaining social circles. The GUI 300 can provide a social graph editor user interface (UI). In some implementations, the UI 301 can be an interface presented by a purpose made social networking application, while in some implementations the UI 301 can be one or more web pages of a social networking website displayed in a general purpose web browser.

The UI 301 includes a number of selectable links presented in a menu bar 305. In the present example, the "Social Net-work" link has been selected by a user. This selection causes a web-based social networking application to be executed and a social network menu 310 to be displayed. The social network menu 310 includes a profile indicator 312 in which information such as a user name 314 and a user image 316 associated with the currently logged in user (Rob McDavies) are displayed.

The social network menu 310 also displays, among other items, a circles submenu 318. The circles submenu 318, when selected (e.g., as represented by the highlighting of the submenu's title), causes a social circle display 320 to be displayed. The social circle display 320 includes a number of social circle representations 322a-322e that are visual representations of various social circles that the user has created or is able to interact with. Each of the social circle representations 322a-322e displays information about the social circle it represents. For example, the social circle representation 322c displays a name 324a (Music Festival), a count 324b of the number of contacts associated with the social circle, and an indication of what type of social circle that the social circle representation is representative of (e.g., query-based, personal, private shared, public shared).

The social circle display 320 also includes a contact display 326. The contact display 326 provides a graphical interface for viewing, selecting, and organizing items in the user's contact lists. A collection of contact icons 328a-328i represents the contacts or other entities (e.g., organizations, places, or other items) socially networked with the particular user. In some implementations, the icons can be digital images of the contacts that are represented (e.g., the icons 328a, 328d), arbitrary images (e.g., the icons 328b, 328g), or placeholders (e.g., when the contact has no image associated with their account, such as the icon 328c). Contacts who are members of one or more of the user's social circles are identified by an indicator 330 superimposed upon the icons (e.g., the icons 328a, 328f, 328h). A scroll bar 329 is provided for the user to access additional contact icons that may not fit into the initial view.

A collection of filter buttons 332a-332d is provided to select subsets of the user's contacts. The "all people" filter button 332a, when selected, causes the contact display 326 to display the user's contacts with substantially no filtering. The "selected" filter button 332b, when selected, causes the contact display to display only the contacts that have been selected by the user. For example, the user may select multiple contacts while in an "all people" view, and then display only selected contacts by pressing the "selected" filter button 332b. The "in circles" filter button 332c, when selected, causes the contact display 326 to display substantially only the contacts who share at least one social circle with the user. The "no circles" filter button 332d, when selected, causes the contact display 326 to display substantially only the contacts that is not in a social circle with the user. A search input box 325 is provided so the user can type in all or part of a name, and the resulting matches will appear in the contact display 326.

The social circle display 320 also includes a collection of social circle filter buttons 340a-340d. The "all circles" button 340a, when selected, causes the social circle display 320 to display representations of substantially all of the social circles that the user is able to interact with. The "personal" button 340b, when selected, causes the social circle display 320 to display representations of substantially only the user's personal social circles. The "shared" button 340c, when selected, causes the social circle display 320 to display representations of substantially only the user's shared private social circles. The "shared-public" button 340d, when selected, causes the social circle display 320 to display representations of only the user's shared public circles. The "query-based" button 340*d*, when selected, causes the social circle display 320 to display only representations of query-based social circles.

The social circle representations 322*c* and 322*d* are graphical representations of query-based social circles, such as the social circle 240 of FIG. 2. In the illustrated example, the social circle representation 322*c* represents a query-based social circle that has been formed for use by users who are associated to a particular event and/or location (e.g., Music Festival). For example, the user (Rob McDavies) may have explicitly or implicitly indicated that the user is attending, has attended or will attend a particular music festival. In some implementations, a user may have indicated that they were at, or had shown an interest in, the music festival, for example, by posting comments mentioning the music festival, by posting comments or photos from the music festival, by showing an explicit interest (e.g., "liking") the music festival, by checking into the music festival and/or through any other appropriate means. In some implementations, a user's attendance at the event and/or location can be implied. For example, location data voluntarily provided by the user (e.g., GPS location data, WiFi location data and/or cell tower location data) can indicate that the user is at a particular location. The social networking service can process other publicly available data, such as the time and date, and can deduce that, in the instant example, the music festival is occurring at the particular location at the given time and date. In this manner, it can be implicitly determined that the user is attending the music festival.

A query may have been generated to identify all users of the social networking service that are attending, have attended or will attend the particular music festival. Users, including the particular user (Rob McDavies) are identified based on the query and the social circle representation 322*c* is presented to the identified users. In some implementations, the name 324*a* can be determined from information provided by one or more users. For example, one or more users may post a number of time-indexed and geotagged photos to a collection of photos entitled "Music Festival," and a social networking service may derive the name 324*a* therefrom. In some implementations, the name 324*a* can be determined from other publicly available information, such as a website advertising the Music Festival as occurring at the particular location at the particular time and date.

In some implementations, the name 324*a* can be determined by compiling information from multiple sources. For example, the music festival may be held in a local football stadium. A large number of users may post information from the event, but based on location alone, the social networking system may assume that the users were at a football game, rather than a concert or monster truck show that might also be held in such a facility. In such an example, the social networking system can identify the time range and geographic location of the posts. From the identified location, the social networking system can determine that the unknown event occurred at the football stadium and an event schedule associated with the stadium's website or a ticket outlet, and then use the identified time range to identify the event that the users attended and name it accordingly. In another example, users may submit social networking posts about an event that is not necessarily associated with a well-known place or schedule, such as at the site of a building fire or traffic accident that may attract a crowd of witnesses or bystanders who submit posts about the event. The social networking system may detect that an unusual amount of social networking traffic has been generated within a short time period and within close proximity to each other. The social networking system may use such a trend to detect that an event has occurred at this particular place and time. As such, the social networking system may analyze news websites and newsfeeds for stories and alerts that correspond to the identified time and location, and extract information may be used to determine the name 324*a*.

In some implementations, the social circle display 320 can present one or more query-based social circles that have been determined to have an estimated greatest relevance to the user. For example, a plurality of query-based social circles can be generated as being associated with a particular user. Instead of showing all of the query-based social circles that may be of interest to the particular user, the social networking service may elect to only display a subset of the query-based social circles. In some implementations, only the top few query-based social circles are displayed to the user. For example, each query-based social circle may be scored based on a relevance of the query-based social circle to the particular user. In some examples, the relevance score can be based on the frequency at which the particular user interacts with the underlying subject of the social circle. For example, in the case of the underlying subject including a location (e.g., restaurant, park, coffee shop, museum), the relevance score can be based on the frequency at which the particular user visits the location. The more frequent that the user visits the location, the higher the relevance score. For example, the relevance score corresponding to a query-based social circle for a location that the user visits on a daily basis may be higher than the relevance score corresponding to a query-based social circle for a location that the user visits infrequently. In some implementations, the query-based social circles can be ranked in order based on the respective relevance scores and the top scoring (e.g., top two, top three) query-based social circles are displayed to the user.

In some implementations, whether a query-based social circle is presented to a particular user that has been identified can be determined based on a threshold relevance score. For example, the relevance score of a query-based social circle relative to a particular user can be compared to the threshold relevance score. If the relevance score is greater than or equal to the threshold relevance score, the query-based social circle is deemed to be sufficiently relevant to the user and is offered to the particular user. If the relevance score is not greater than or equal to the threshold relevance score, the query-based social circle is not deemed to be sufficiently relevant to the user and is not offered to the particular user.

Query-based circles can incorporate privacy and visibility controls. In some implementations, membership in a query-based social circle can be voluntary. For example, a user at a restaurant may wish to post a picture of her plate to the social networking service. As part of the posting process, the user may be provided with a user interface in which she may choose individuals or social circles to which she wants to show the picture. The social networking service may detect that the user's is currently at the restaurant and determine that a query-based social circle exists or could be created for the restaurant. In response, the social networking service can generate a query-based social circle and offer the query-based social circle for the restaurant as a target for the user's post.

In the illustrated example, the social circle representation 322*d* corresponds to a query-based social circle for the "Grand Hotel" and may be offered to the user because he has checked-in there, has booked a stay there, is determined as having stayed there recently, and/or the user's location data indicates that he is at or within a particular distance of the location. In some implementations, the user may explicitly join a query-based social circle before the user is able to interact with content or other users in the query-based social circle. For example, the user may not be able to interact with content or users in the query-based social circle until the user joins the query-based social circle or distributes content to the query-based social circle.

In some implementations, by joining or posting to a query-based social circle, the user may become visible to other members of the circle. In some implementations, the user may submit posts to the query-based social circle while remaining anonymous to other members of the query-based social circle.

In some implementations, the user may be given anonymous read-only access to a query-based social circle. For example, the user may be able to anonymously view other user's posts and photos in the "Grand Hotel" social circle representation 322d while researching hotels for an upcoming trip. In some implementations, if the user chooses to join, post a comment or reply, or otherwise actively interact with the query-based social circle, the user may become a member of the query-based social circle.

In some implementations, the identities of members of query-based social circles may be kept anonymous from non-members. For example, non-members may be able to read discussion threads in which the participants' names and images have been removed or otherwise obfuscated, and when the user joins the circle, the other users' identities may be revealed. In some implementations, the identities of members of query-based social circles may be kept anonymous for all users. For example, users may participate in a social circle in which all user's identifying information is automatically anonymized, thereby allowing users to interact without exposing their online identity to one another.

Figure 4A:
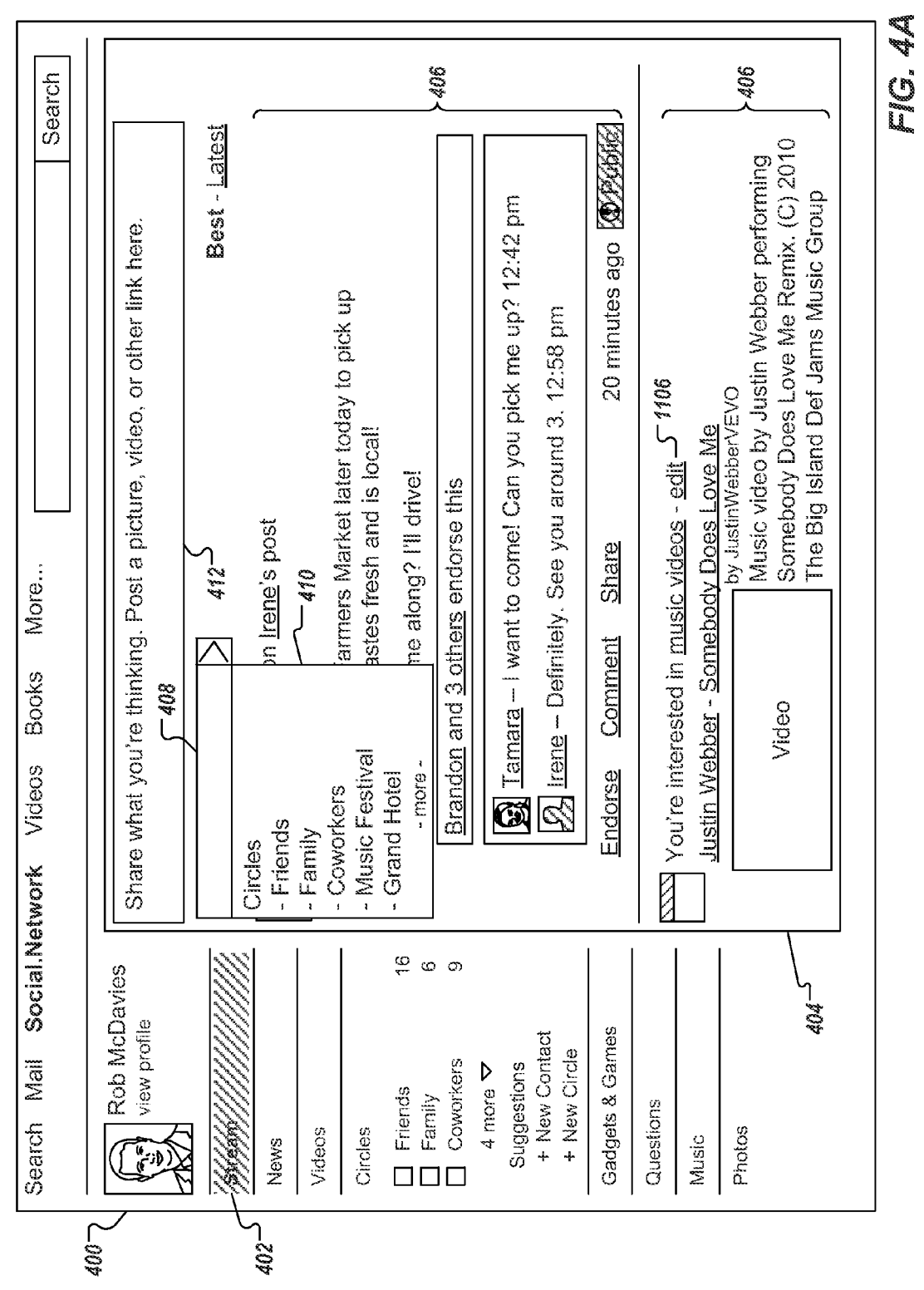

FIGS. 4A and 4B depict example stream pages for a user of a social networking service. FIG. 4A depicts an example stream page 400 for presenting digital content that has been distributed to the user (e.g., Rob McDavies). In some implementations, the stream page 400 can be displayed when a user selects a stream selector 402. In general, a stream frame 404 displays a listing of digital content 406 such as status updates, posts, digital images, digital video and/or links to digital content that has been received by the user through the social networking service.

The frame 404 can include a filter box 408 that the user can interact with to filter the source of the digital content. In the illustrated example, the user can click on the filter box 408 and a plurality of filter options 410 can be displayed to the user. In some implementations, the filter options 410 can include a list of social circles that can be used as filter criteria. For example, if the user selects "Query-based Circles," only digital content distributed to the user through query-based social circles is displayed to the user in the stream frame 404.

The stream page 400 can include a post input area 412. The user can click in the post input area 412, indicating an intent to post digital content to the social networking service. As discussed below with reference to FIG. 4B, the user can distribute digital content using the social networking service using through the post input area 412.

FIG. 4B depicts the stream page 400 after the user has clicked in the post input area 412. In the illustrated example, a post box 414 expands from the post input area 412 when the user selects the post input area 412. The post box 414 includes an input area 416. A post into a text region 418 of the input area 416 is provided into which the user can enter text. A link selector 420, when selected, presents an interface that assists the user with entering a hyperlink (e.g., a uniform resource indicator (URI)) to a resource (e.g., a web page). An image selector 422, when selected, presents an interface that assists the user with adding a digital image for distribution. Other selectors can be provided and can include, for example, a digital video selector and/or a location selector (e.g., that provides a link to a map).

The post box 414 includes a distribution dialog box 430. In some implementations, the distribution dialog box 430 provides an interface that enables the user to determine the distribution of the digital content. For example, the user may add or remove contacts, social circles, groups, or other identities from the distribution dialog box 430 to control who will receive the digital content. In the illustrated example, a query-based circle icon 432 (corresponding to the "Music Festival" query-based social circle discussed above) appears in the distribution dialog box 430 to indicate that the digital content is intended to be shared with only users that are associated with the particular query-based social circle. An add link 434, when selected, presents an interface in which the user is able to select additional contacts and/or social circles to be added. A post button 436, when selected, causes the newly authored post including the selected digital content to be published and distributed through the social networking service.

Figure 5:
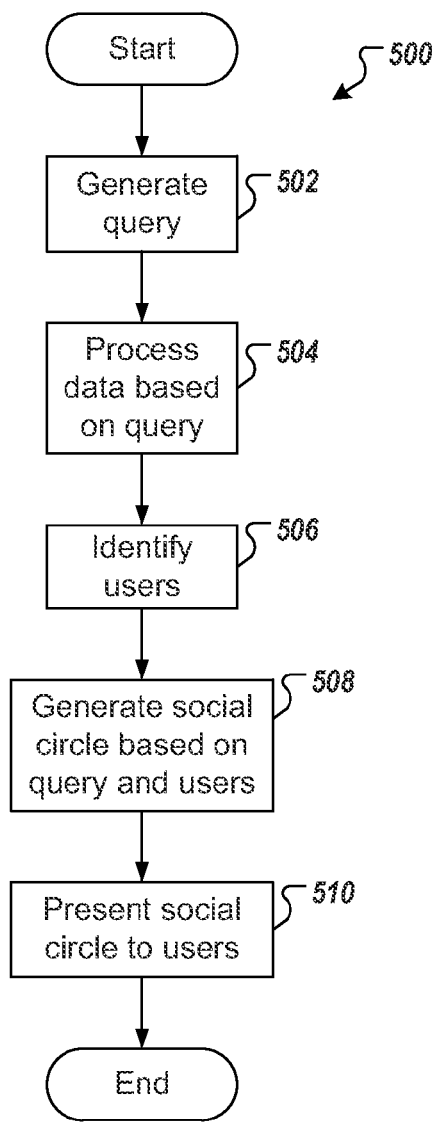
FIG. 5 is a flowchart illustrating an example process for generating query-based social circles in accordance with implementations of the present disclosure.

FIG. 5 is a flowchart illustrating an example process 500 for generating a query-based social circle within a social network. The process 500 can be executed using one or more computing devices, such as server device 112 of FIG. 1. A query is generated (500). Data is processed based on the query (504). For example, one or more computing devices can process data submitted by users of a social networking service. Users are identified (506). For example, a plurality of users can be identified as having some commonality to one another in view of the query and the processed data. A query-based social circle is generated based on the query and the identified users (508). For example, the query-based social circle can reflect the commonality between the identified users and can serve as a means for defining distribution of digital content by one or more of the identified users. The query-based social circle is presented to each of the identified users (510). For example, computer-executable instructions can be transmitted to a user computing device (e.g., as part of a web page) that, when executed, generate a graphical representation of the query-based social circle in a display (e.g., in a user interface of a website of a social networking service). As discussed in detail herein, the user can use the query-based social circle to distribute digital content to and receive digital content from other identified users associated with the query-based social circle.

Figure 6:
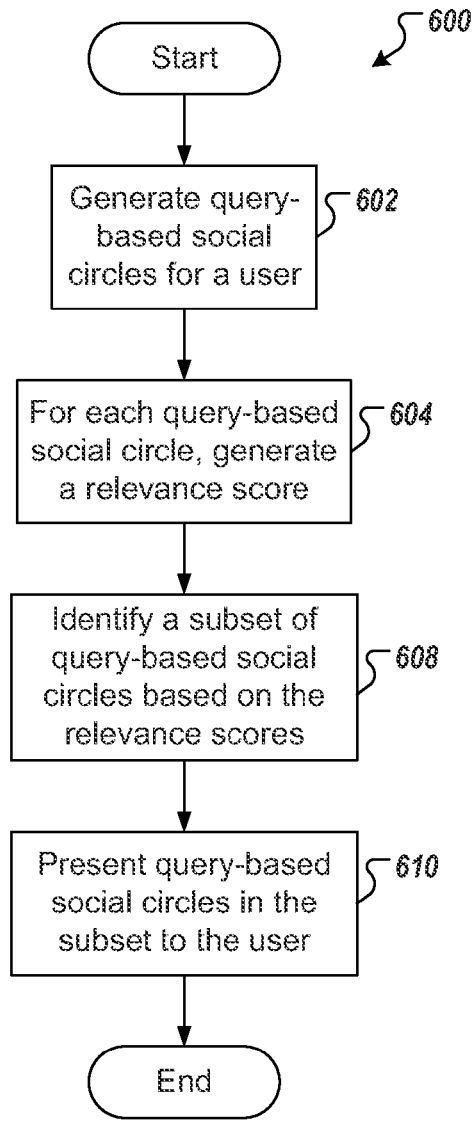
FIG. 6 is a flowchart illustrating an example process for presenting query-based social circles to a user in accordance with implementations of the present disclosure.

FIG. 6 is a flowchart illustrating an example process 600 for presenting query-based social circles to a user in accordance with implementations of the present disclosure. The process 600 can be executed using one or more computing devices, such as server device 112 of FIG. 1. Query-based social circles that are relevant to a user are generated (602). As discussed above with reference to FIG. 5, each query-based social circle can be generated based on a query and data submitted by users of a social networking service. The user can be identified along with one or more other users as having some commonality to one another in view of the query and the processed data. For each query-based social circle, a relevance score is generated (604). As discussed above, each relevance score can reflect the relevance of a respective query-based social circle to the user. A subset of query-based social circles is identified based on the relevance scores (608). For example, the query-based social circles can be ranked in order based on the respective relevance scores and the top scoring (e.g., top two, top three) query-based social circles are provided in the subset of query-based social circles. The query-based social circles in the subset of query-based social circles are presented to the user (610). For example, computer-executable instructions can be transmitted to a user computing device (e.g., as part of a web page) that, when executed, generate a graphical representation of each of the query-based social circles in a display (e.g., in a user interface of a website of a social networking service). As discussed in detail herein, the user can use each of the query-based social circles to distribute digital content to and receive digital content from other identified users associated with the query-based social circles.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the present disclosure have been described. Other implementations are within the scope of the following claims. For example, the actions recited in the claims can be performed in a different order and still achieve desirable results.

What is claimed is:

1. A system comprising:
  a computing device; and
  a computer-readable medium coupled to the computing device and having instructions stored thereon which, when executed by the computing device, cause the computing device to perform operations comprising:
    receiving user-provided data from at least one user of a first plurality of users, the user-provided data comprising at least a portion of a post to be posted to a social networking service and indicating at least one of temporal information or location information; and
    in response to receiving the user-provided data, automatically, without user-intervention:
      determining one or more queries based on at least one of the temporal information or the location information;
      processing data stored in a data store based on at least one query of the one or more queries to identify a second plurality of users, the second plurality of users sharing a commonality of at least one of the temporal information or the location information;
      generating one or more query-based social circles, the second plurality of users populating a query-based social circle of the one or more query-based social circles, the query-based social circle being directed to the commonality and defining a distribution list for distributing the post using the social networking service to one or more users of the second plurality of users; and
      transmitting social circle data corresponding to the query-based social circle to display a representation of the query-based social circle to at least one user of the first plurality of users.

2. The system of claim 1, the operations further comprising:
  receiving user input from the at least one user, the user input indicating instructions to distribute the digital content included in the user-provided data based on the query-based social circle; and
  in response to receiving the user input, distributing the digital content to users of the second plurality of users.

3. The system of claim 1, wherein the operations further comprise:
  for each user:
    generating a relevance score, the relevance score reflecting a relevance of the query-based social circle to the user; and
    determining that the relevance score is greater than or equal to a threshold relevance score, wherein transmitting social circle data comprises transmitting the social circle data to the user in response to determining that the relevance score is greater than or equal to a threshold relevance score.

4. The system of claim 1, wherein the operations further comprise:
  for each user:
    generating a plurality of relevance scores, each relevance score of the plurality of relevance scores reflecting a relevance of a respective query-based social circle to the user;
    ranking the query-based social circles based on the plurality of relevance scores; and
    identifying a subset of query-based social circles based on the ranking, wherein transmitting social circle data comprises transmitting the social circle data corresponding to query-based social circles in the subset of query-based social circles.

5. The system of claim 1, wherein the data comprises data submitted by each user of the first plurality of users to the social networking service.

6. The system of claim 1, wherein the temporal information or location information is received from digital content comprising at least one of text, status data, an image, a video and a hyperlink.

7. The system of claim 1, wherein the temporal information or location information is determined from at least one of a location, an event, a locale and a route.

8. The system of claim 1, wherein the second plurality of users are anonymous to one another.

9. The system of claim 1, wherein the query comprises a search query and processing data stored in a data store based on the query comprises determining a commonality between one or more users based on the data.

10. The system of claim 1, wherein the commonality comprises at least one of a location, an event, a locale and a route.

11. The system of claim 1, wherein determining the at least one query includes generating the at least one query in response to user input provided by a user of the first plurality of users.

12. The system of claim 11, wherein the user input comprises at least one of a location, event, locale and route information provided by the user to the social networking service.

13. The system of claim 1, wherein the operations further comprise processing digital content distributed through the social networking service to identify an occurrence of the commonality, wherein determining the at least one query includes generating the at least one query in response to the occurrence.

14. The system of claim 13, wherein the occurrence comprises an event and the commonality comprises attendance of each user of the second plurality of users at the event.

15. The system of claim 13, wherein the occurrence is associated with a location and the commonality comprises a presence of each user of the second plurality of users at the location.

16. The system of claim 1, wherein each user in the second plurality of users is a user of the social networking service.

17. The system of claim 1, wherein transmitting social circle data corresponding to the query-based social circle to display a representation of the query-based social circle, comprises transmitting to each user of the second plurality of users.

18. A non-transitory computer storage medium encoded with a computer program, the program comprising instructions that when executed by one or more computers cause the one or more computers to perform operations comprising:
   receiving user-provided data from at least one user of a first plurality of users, the user-provided data comprising at least a portion of a post to be posted to a social networking service and indicating at least one of temporal information or location information; and
   in response to receiving the user-provided data, automatically, without user-intervention:
      determining one or more queries based on at least one of the temporal information or the location information;
      processing data stored in a data store based on at least one query of the one or more queries to identify a second plurality of users, the second plurality of users sharing a commonality of at least one of the temporal information or the location information;
      generating one or more query-based social circles, the second plurality of users populating a query-based social circle of the one or more query-based social circles, the query-based social circle being directed to the commonality and defining a distribution list for distributing the post using the social networking service to one or more users of the second plurality of users; and
      transmitting social circle data corresponding to the query-based social circle to display a representation of the query-based social circle to at least one user of the first plurality of users.

19. A computer-implemented method comprising:
receiving, by a computer device, user-provided data from at least one user of a first plurality of users, the user-provided data comprising at least a portion of a post to be posted to a social networking service and indicating at least one of temporal information or location information; and
in response to receiving the user-provided data, automatically, without user-intervention:
   determining, by the computer device, one or more queries based on at least one of the temporal information or the location information;
   processing, by the computer device, data stored in a data store based on at least one query of the one or more queries to identify a second plurality of users, the second plurality of users sharing a commonality of at least one of the temporal information or the location information;
   generating, by the computer device, one or more query-based social circles, the second plurality of users populating a query-based social circle of the one or more query-based social circles, the query-based social circle being directed to the commonality and defining a distribution list for distributing the post using the social networking service to one or more users of the second plurality of users; and
   transmitting, by the computer device, social circle data corresponding to the query-based social circle to display a representation of the query-based social circle to at least one user of the first plurality of users.

* * * * *